(12) United States Patent
Kamon et al.

(10) Patent No.: US 12,496,708 B2
(45) Date of Patent: Dec. 16, 2025

(54) ROBOT

(71) Applicant: KAWASAKI JUKOGYO KABUSHIKI KAISHA, Hyogo (JP)

(72) Inventors: Masayuki Kamon, Hyogo (JP); Tomoki Oka, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 275 days.

(21) Appl. No.: 18/268,502

(22) PCT Filed: Dec. 22, 2021

(86) PCT No.: PCT/JP2021/047490
§ 371 (c)(1),
(2) Date: Jun. 20, 2023

(87) PCT Pub. No.: WO2022/138695
PCT Pub. Date: Jun. 30, 2022

(65) Prior Publication Data
US 2024/0017402 A1 Jan. 18, 2024

(30) Foreign Application Priority Data
Dec. 24, 2020 (JP) ................. 2020-215747

(51) Int. Cl.
*B25J 9/00* (2006.01)
*B25J 9/16* (2006.01)
(Continued)

(52) U.S. Cl.
CPC ............. *B25J 9/162* (2013.01); *B25J 9/0009* (2013.01); *B25J 15/0491* (2013.01); *B25J 19/005* (2013.01)

(58) Field of Classification Search
CPC ...... B25J 9/162; B25J 9/0009; B25J 15/0491; B25J 19/005
See application file for complete search history.

(56) References Cited

U.S. PATENT DOCUMENTS 10,568,704 B2 * 2/2020 Savall .................... A61B 90/60
2016/0011593 A1 1/2016 Oberoi et al.
(Continued)

FOREIGN PATENT DOCUMENTS

JP 62-48478 3/1987
JP 5-293734 11/1993
(Continued)

OTHER PUBLICATIONS

Goldenberg et al., AARM: A robot arm for internal operations in nuclear reactors, 2010, IEEE, p. 1-5 (Year: 2010).*
Hengjuan et al., Design of the Aerial Work Robot with Self-propelled, 2018, IEEE, p. 1155-1158 (Year: 2018).*
Zom et al., A Novel Telemanipulated Robotic Assistant for Surgical Endoscopy: Preclinical Application to ESD, 2017, IEEE, p. 797-808 (Year: 2017).*

(Continued)

*Primary Examiner* — Mcdieunel Marc
(74) *Attorney, Agent, or Firm* — Greenblum & Bernstein, P.L.C.

(57) ABSTRACT

A robot includes a self-propelled carriage, one or more robotic arms that are mounted on the carriage and allow an end effector to be attached thereto and detached therefrom, a storage that is mounted on the carriage and allows, to be stored, the end effector removed from the one or more robotic arms and the end effector to be attached to the one or more robotic arms, and a covering that is mounted on the carriage and covers the storage from above.

7 Claims, 8 Drawing Sheets

(51) Int. Cl.
*B25J 15/04* (2006.01)
*B25J 19/00* (2006.01)

(56) References Cited

U.S. PATENT DOCUMENTS

2020/0315721 A1* 10/2020 Rabindran ............. A61B 34/37
2022/0071827 A1*  3/2022 Phillips ................... H02J 9/06

FOREIGN PATENT DOCUMENTS

| JP | 11-188545   | 7/1999  |
|----|-------------|---------|
| JP | 2001-287190 | 10/2001 |
| JP | 2014-147997 | 8/2014  |
| JP | 2016-16861  | 2/2016  |
| JP | 2016-209971 | 12/2016 |

OTHER PUBLICATIONS

Stieber et al., Robotic systems for the International Space Station, 1997, IEEE, p. 1-6 (Year: 1997).*
Fontana et al., The Body Extender: A Full-Body Exoskeleton for the Transport and Handling of Heavy Loads, 2014, IEEE, p. 1--11 (Year: 2014).*
Groothuis et al., Lending a helping hand: toward novel assistive robotic arms, 2013, IEEE, p. 1-10 (Year: 2013).*
Barrett et al., Mechatronic design of a variable stiffness robotic arm, 2017, IEEE, p. 4582-4588 (Year: 2017).*
Xu et al., Dual-use mobile detachable manipulator-(DM)/sup 2/, 1994, IEEE, p. 255-260 (Year: 1994).*
Official Communication issued in International Patent Application No. PCT/JP2021/047490, dated Mar. 8, 2022, along with English language translation.

* cited by examiner

ROBOT

CROSS-REFERENCE TO RELATED APPLICATION

This application claims the priority and its benefit to Japanese Patent Application No. 2020-215747 filed on Dec. 24, 2020 with the Japan Patent Office, the entire contents of which are incorporated herein as a part of this application by reference.

TECHNICAL FIELD

The present disclosure relates to a robot.

BACKGROUND ART

Conventionally, robots are used for substituting people for works. For example, JP1999-188545A discloses a mobile robot which moves between work places and performs a work at each work place. The mobile robot includes a robot body having an arm, a carrier which carries the robot body thereon, and a controller which controls the robot body and the carrier. The mobile robot has in the carrier a tool storage where a plurality of kinds of tools which are attached to the arm are placed, and it is configured to replace tools while the mobile robot is moving.

DESCRIPTION OF THE DISCLOSURE

In recent years, service robots which are robots for providing services to people are devised. Such a robot exists in the same space with various persons. For example, when the mobile robot of JP1999-188545A is used as a service robot, the tool storage and the tools in the tool storage can be visually observed by people around the mobile robot, and are also accessible to those people. The mechanical appearance of the tools may spoil the fine sight for those who visually observe them. When the people around the tools touch the tools, a problem may arise in the hygiene and the functions of the tools.

One purpose of the present disclosure is to provide a robot which enables covering of a stored end effector.

The robot according to one aspect of the present disclosure includes a self-propelled carriage, one or more robotic arms that are mounted on the carriage and allow an end effector to be attached thereto and detached therefrom, a storage that is mounted on the carriage and allows, to be stored, the end effector removed from the one or more robotic arms and the end effector to be attached to the one or more robotic arms, and a covering that is mounted on the carriage and covers the storage from above.

MODES FOR CARRYING OUT THE DISCLOSURE

Figure 1:
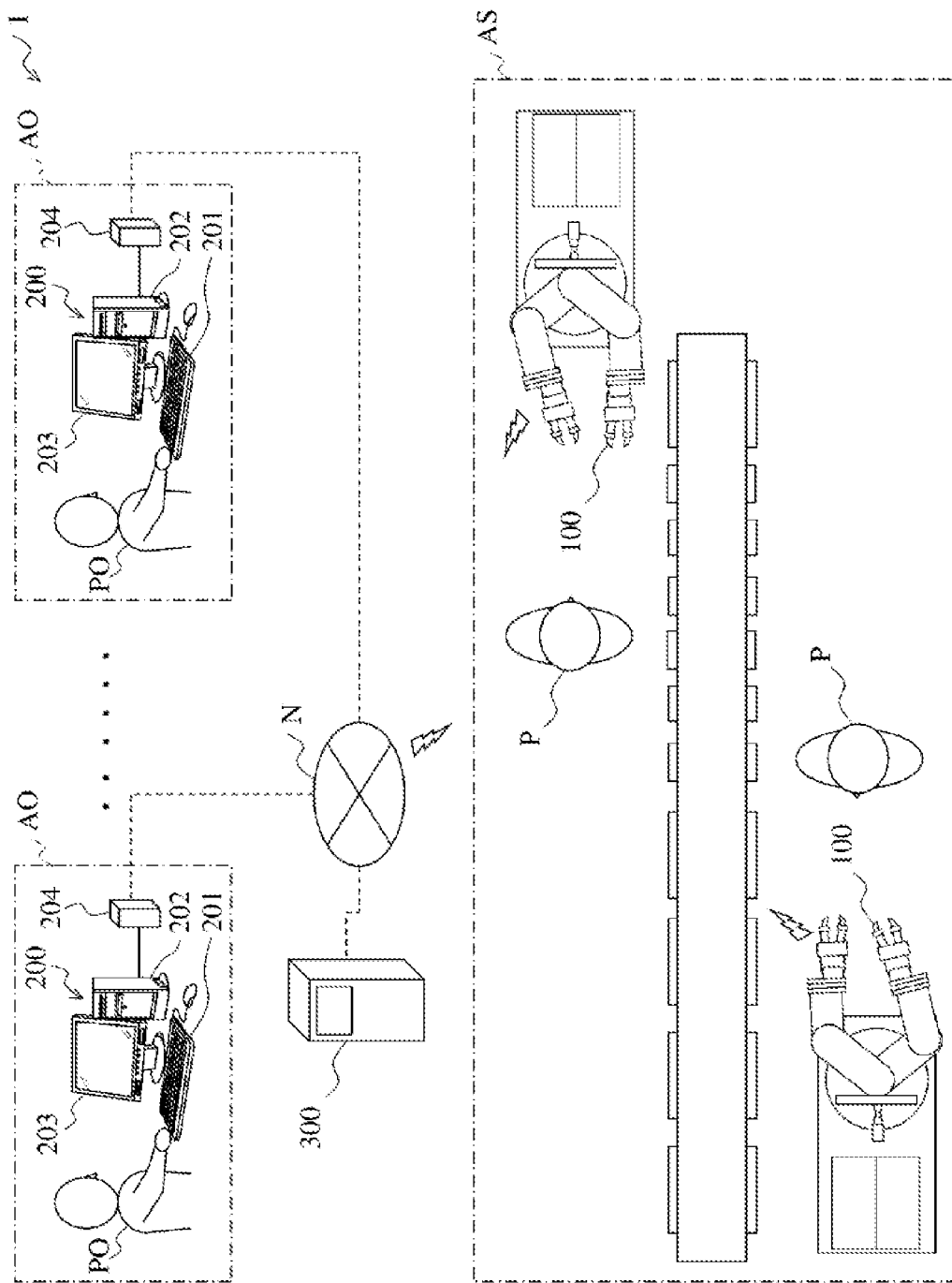
FIG. 1 is a view illustrating one example of a configuration of a robot system according to one embodiment.

Hereinafter, an illustrative embodiment of the present disclosure will be described with reference to the drawings. Each embodiment which will be described below illustrates a comprehensive or concrete example. Among components in the following embodiment, components which are not described in the independent claim(s) indicating the top concept are described as arbitrary components. Each of the figures in the accompanying drawings is a schematic figure, and is not necessarily illustrated exactly. In each drawing, the same reference characters are assigned to substantially the same components, and redundant explanation may be omitted or simplified. In this specification and the appended claims, a "device" may not only mean a sole device, but may also mean a system comprised of devices.

Configuration of Robot System

One example of a configuration of a robot system 1 according to the illustrative embodiment is described. FIG. 1 is a view illustrating one example of the configuration of the robot system 1 according to one embodiment. As illustrated in FIG. 1, the robot system 1 according to one embodiment includes one or more robots 100, one or more operation terminals 200, and a server 300. Although not limited, in this embodiment, the robot system 1 is configured to provide services to a user P by using the robot 100 which is manipulated from a remote location. The robot system 1 can be used in various service industries, such as nursing, medical science, cleaning, guard, guidance, rescue, cooking, and goods offer.

Although not limited, in this embodiment, robots 100 are disposed at one service providing area AS which is a place from which services are provided to the user P. One or more operation terminals 200 are disposed at each of operation areas AO which are located at positions distant from the service providing area AS.

The robot 100 is configured to be connected wirelessly with a communication network N so that data communications are possible. The robot 100 may be connected with the communication network N wiredly, or by a combination of wired and wireless communications. The operation terminal 200 is configured to be connected with the communication network N wiredly, wirelessly, or a combination thereof so that data communications are possible. One robot 100 and one operation terminal 200 may be connected with each other so that data communications are possible via the communication network N. Any kind of wired and wireless communications may be used.

The server 300 manages communications through the communication network N. The server 300 includes a computer. The server 300 manages authentication of a communication, a connection, a disconnection, etc. between the robot 100 and the operation terminal 200. For example, the server 300 stores identification information, security information, etc. on the robot 100 and the operation terminal 200 which are registered to the robot system 1, and authenticates qualification of the operation terminal 200 for a connection with the robot system 1 based on the information. The server 300 may manage communications of data between the robot 100 and the operation terminal 200, and these data may go through the server 300. The server 300 may be configured to convert data transmitted from a transmission source into data format which can be handled by a transmission destination. The server 300 may be configured to store and accumulate information, command, data, etc. which are communicated between the robot 100 and the operation terminal 200 in the process of manipulation of the robot 100.

The communication network N is not limited in particular, but it may include, for example, a local area network (LAN), a wide area network (WAN), the Internet, or a combination of two or more. The communication network N may be configured to use a short-distance wireless communications, such as Bluetooth® and ZigBee®, a dedicated line to network, a dedicated line of a communication enterprise, a Public Switched Telephone Network (PSTN), a mobile communications network, the Internet network, satellite communications, or a combination of two or more. The mobile communications network may use the 4th-generation mobile communications system, the 5th-generation mobile communications system, etc. The communication network N may include one or more networks. In this embodiment, the communication network N is the Internet.

Configuration of Operation Terminal

One example of a configuration of the operation terminal 200 according to one embodiment is described. As illustrated in FIG. 1, the operation terminal 200 is capable of accepting an input of a command, information, data, etc. by an operator PO, and is capable of outputting the accepted command, information, data, etc. to other devices. The operation terminal 200 includes an operational inputter 201, a terminal computer 202, a presenter 203, and a communicator 204. The operational inputter 201, the terminal computer 202, the presenter 203, and the communicator 204 may be integrated so as to form a sole device, or each may form a device independently which may be connected with each other, or two or more of them may form a sole device and may be connected with other devices.

The configuration of the operation terminal 200 is not limited in particular. For example, the operation terminal 200 may be a computer such as a personal computer, a smart device such as a smartphone and a tablet, a personal information terminal, a game terminal, a known teaching device such as a teach pendant, which is used for teaching a robot, a known interface of a robot, other interfaces, other terminals, a device utilizing these, a device obtained by improving these, etc. The operation terminal 200 may be a device for exclusive use devised for the robot system 1, or may be a general-purpose device which is available in the market. In this embodiment, the known general-purpose device is used for the operation terminal 200. This device may be configured to realize the function of the operation terminal 200 of the present disclosure by software for exclusive use being installed.

The operational inputter 201 is configured to accept the input by the operator PO and output a signal indicative of the inputted command, information, data, etc. to the terminal computer 202. The configuration of the operational inputter 201 is not limited in particular. For example, the operational inputter 201 may also include a device to which an input is given through operation by the operator PO, such as a button, a lever, a dial, a joystick, a mouse, a key, a touch panel, a motion capture, etc. The operational inputter 201 may also include an imager, such as a camera, which captures an image of the operator PO etc., and a voice inputter, such as a microphone, which accepts an input of voice of the operator PO etc. The operational inputter 201 may be configured to output the captured image data and a signal indicative of the inputted voice to the terminal computer 202.

The terminal computer 202 is configured to process the command, the information, the data, etc. which are accepted via the operational inputter 201 and output them to other devices, and accept the input of the command, the information, the data, etc. from other devices and process the command, the information, the data, etc.

The presenter 203 includes a display which is capable of displaying an image to the operator PO. The presenter 203 displays an image of the image data received from the terminal computer 202. The presenter 203 may include a voice outputter, such as a speaker, which is capable of outputting voice to the operator PO. The presenter 203 outputs voice of voice data received from the terminal computer 202.

The communicator 204 includes a communication interface which is connectable with the communication network N. The communicator 204 is connected with the terminal computer 202, and connects the terminal computer 202 with the communication network N so that data communications are possible. The communicator 204 may include a communication apparatus, such as a modem, an ONU (Optical Network Unit: a terminating set of an optical circuit), a router, and a mobile data communication apparatus, for example. The communicator 204 may include a computer with a calculation function etc.

Configuration of Robot

Figure 2:
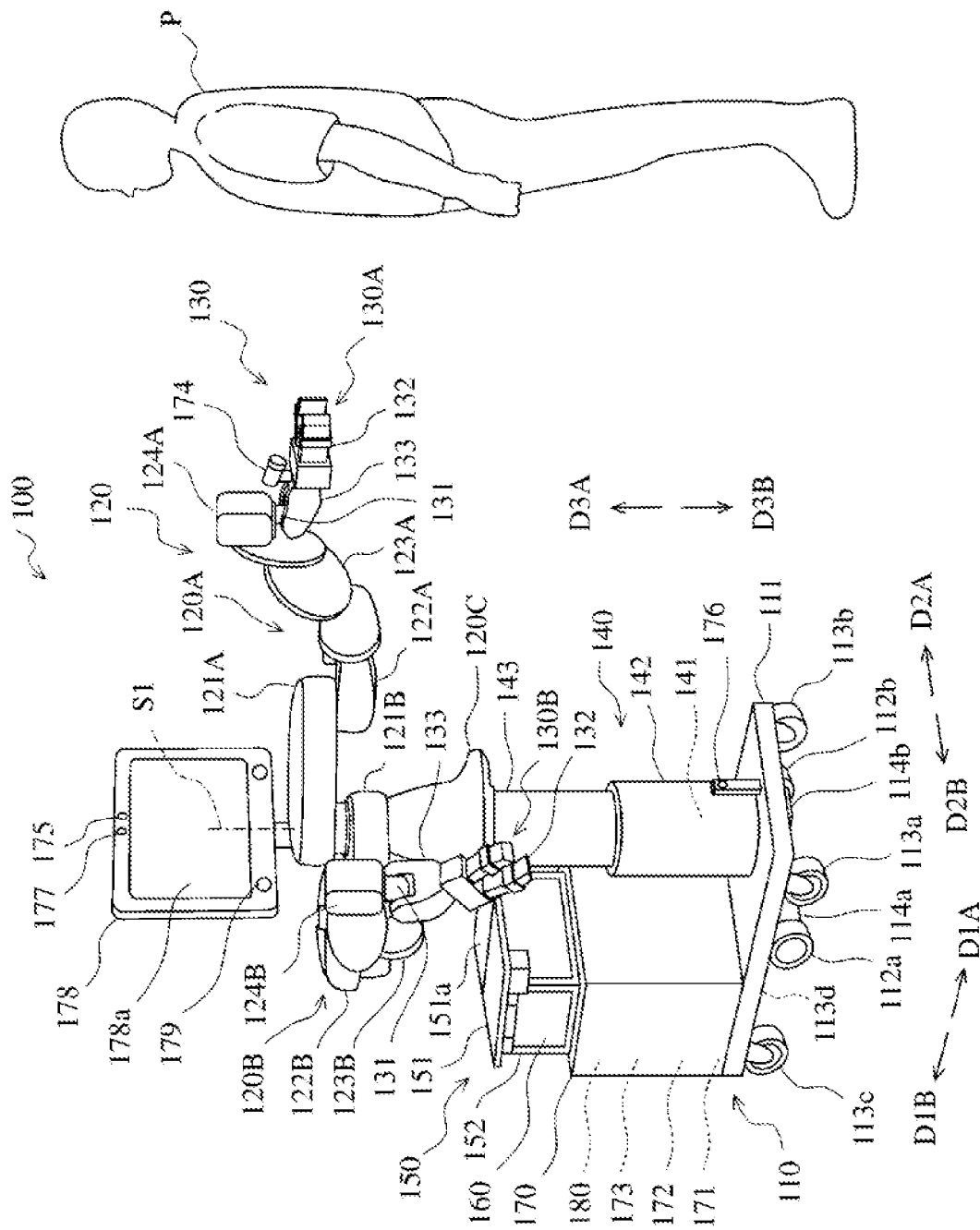
FIG. 2 is a perspective view illustrating one example of a configuration of a robot according to one embodiment.
Figure 3:
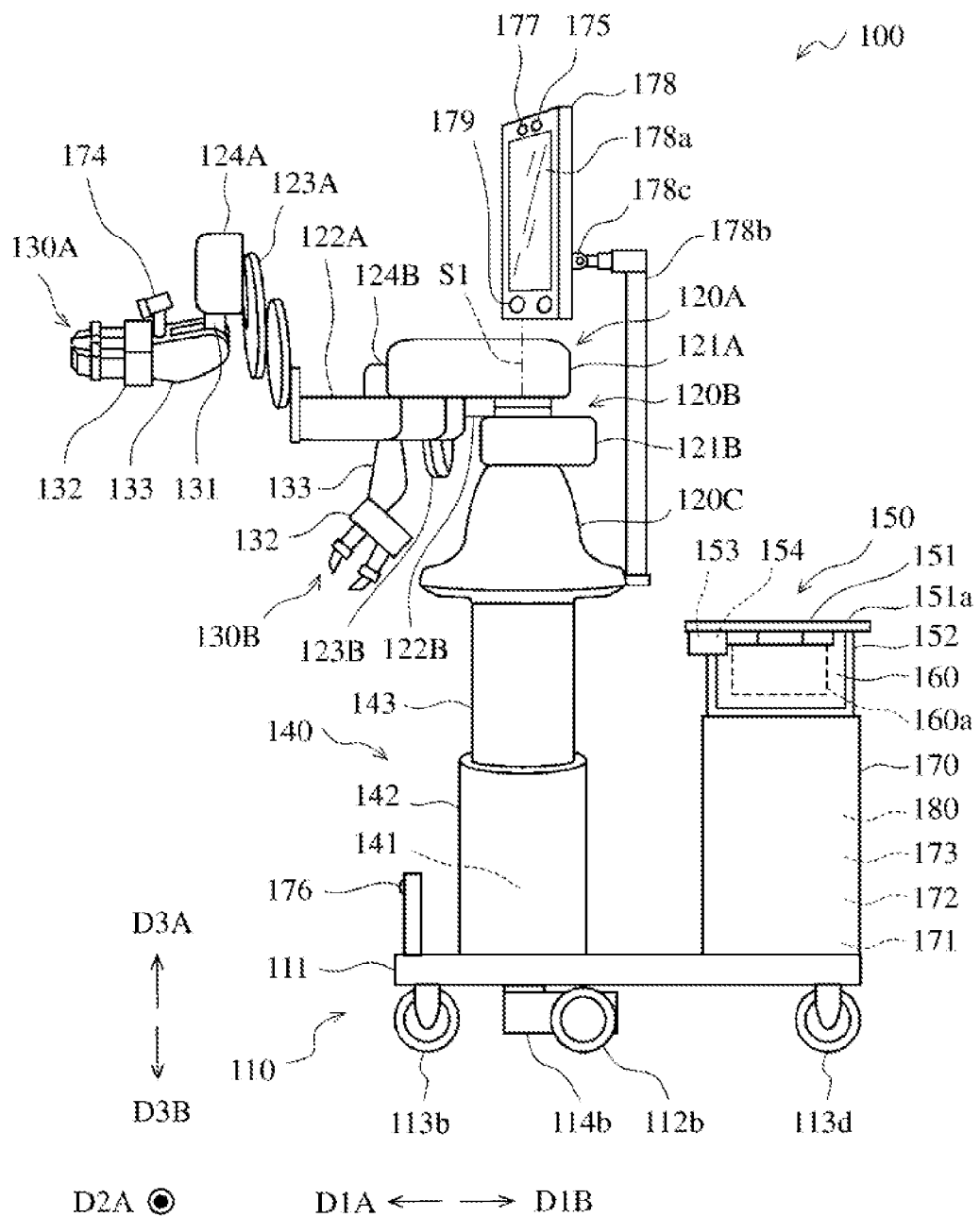
FIG. 3 is a side view illustrating one example of the configuration of the robot according to one embodiment.

One example of a configuration of the robot 100 according to one embodiment is described. FIG. 2 is a perspective view illustrating one example of the configuration of the robot 100 according to one embodiment. FIG. 3 is a side view illustrating one example of the configuration of the robot 100 according to one embodiment.

As illustrated in FIGS. 2 and 3, the robot 100 includes one carriage 110, one or more robotic arms 120, one or more end effectors 130, one lifter 140, one workbench unit 150, one storage 160, a rechargeable battery module 171, a power supply circuit 172, a communicator 173, imagers 174, 175, and 176, a voice collector 177, a display device 178, a voice outputter 179, and a controller 180. Although not limited, in this embodiment, the robotic arm 120 may be a robotic arm which is capable of also functioning for industrial use. The imagers 174, 175, and 176, the voice collector 177, the display device 178, and the voice outputter 179 are examples of a communicator. Regarding each of the components described above, the number of components is not limited to the above-described number, and it may be changed suitably.

The carriage 110 is configured to be self-propelled. Although not limited, in this embodiment, the carriage 110 travels using wheels included in the carriage 110. The carriage 110 includes a pedestal 111, driving wheels 112*a* and 112*b*, auxiliary wheels 113*a*-113*d*, and conveyance drives 114*a* and 114*b*.

The pedestal 111 has a rectangular plate shape in the appearance. For example, the pedestal 111 may have a configuration of a plate-like or frame-like shape which is thin in the up-and-down direction. In this specification and the claims, "up" means an upward direction perpendicular to a horizontal support surface when the robot 100 is disposed on the support surface (i.e., vertically upward), and "down" means a downward direction perpendicular to the support surface similarly (i.e., vertically downward). In the specification and the claims, "perpendicular," "vertical," "horizontal," and "parallel" may include cases of being completely perpendicular, vertical, horizontal, and parallel, and cases of being deemed to be substantially perpendicular, vertical, horizontal, and parallel including nearly completely perpendicular, vertical, horizontal, and parallel, respectively.

The driving wheels 112a and 112b are rotatably attached to the pedestal 111 so that they support the pedestal 111 from below. Although in this embodiment the driving wheels 112a and 112b are disposed at positions eccentric in a direction D1A which is the forward direction of the carriage 110 with respect to the pedestal 111, the layout is not limited to this configuration, and they may be disposed at the center of the pedestal 111, or at a position eccentric in a direction D1B. The driving wheels 112a and 112b are disposed along the pedestal 111 so that they are lined up in a direction D2A perpendicular to the direction D1A. For example, the direction D1A is a direction along the longitudinal direction of the pedestal 111 which is the long-side direction, and the direction D1B is the opposite direction from the direction D1A. The direction D2A is a direction along the transverse direction of the pedestal 111 which is the short-side direction, and the direction D2B is the opposite direction from the direction D2A.

Although not limited, in this embodiment, the driving wheels 112a and 112b are disposed so that the orientation of each rotation axis is fixed with respect to the pedestal 111, and the driving wheels 112a and 112b are rotatable centering on the rotation axes in the directions D2A and D2B. The driving wheels 112a and 112b may be disposed at the pedestal 111 so that they may be movable in a direction approaching and separating from the pedestal 111. The driving wheels 112a and 112b may be configured to be biased by a biasing member, such as a spring, in a direction separating from the pedestal 111. Therefore, the driving wheels 112a and 112b are stable on the ground.

The conveyance drives 114a and 114b are attached to the pedestal 111, and rotate the driving wheels 112a and 112b, respectively. For example, the conveyance drives 114a and 114b include an electric motor as a driving source, and a reduction gear which transmits a rotational driving force of the electric motor to the driving wheels 112a and 112b, respectively. Although not limited, in this embodiment, the electric motors of the conveyance drives 114a and 114b are servomotors. The servomotors are controlled by the controller 180.

The conveyance drives 114a and 114b can move the carriage 110 forward by rotating the driving wheels 112a and 112b in the same direction at the same speed, and can move the carriage 110 rearward by rotating the driving wheels 112a and 112b in the same opposite direction at the same speed. The conveyance drives 114a and 114b can turn the carriage 110 variously by rotating the driving wheels 112a and 112b in states where one or both of the rotating direction and the rotating speed are different from each other.

The auxiliary wheels 113a-113d are rotatably attached to the pedestal 111, and support the pedestal 111 from below. The auxiliary wheels 113a-113d are disposed around the driving wheels 112a and 112b, and in this embodiment, they are disposed at the four corners of the pedestal 111. The auxiliary wheels 113a and 113b are disposed in the direction DIA from the driving wheels 112a and 112b, and the auxiliary wheels 113c and 113d are disposed in the direction D1B from the driving wheels 112a and 112b. Each of the auxiliary wheels 113a-113d has a rotation axis along the pedestal 111. Each of the auxiliary wheels 113a-113d has a configuration so that the orientation of its rotation axis is changeable, while being along the pedestal 111. For example, each of the auxiliary wheels 113a-113d has a configuration of a universal caster. The auxiliary wheels 113a-113d and the driving wheels 112a and 112b are disposed so that they can contact a flat support surface simultaneously, and they support the pedestal 111 together. The auxiliary wheels 113a-113d can change the directions of the rotation axes individually according to the moving direction of the carriage 110, and can roll in the moving direction.

The lifter 140 is disposed on the pedestal 111, and the one or more robotic arms 120 are disposed on the lifter 140. The lifter 140 raises and lowers the one or more robotic arms 120 in an upward direction D3A and a downward direction D3B with respect to the pedestal 111. The upward direction D3A and the downward direction D3B are also directions perpendicular to the pedestal 111.

The configuration of the lifter 140 is not limited in particular, as long as it is capable of raising and lowering the one or more robotic arms 120. Although not limited, in this embodiment, the lifter 140 has a configuration so that it extends and contracts in the directions D3A and D3B. For example, the lifter 140 may have other configurations, such as a configuration so that it includes a member which supports the robotic arm 120 and rotates in the up-and-down direction, or a configuration so that it slides a support member of the robotic arm 120 in the up-and-down direction on a pillar.

The extendable and contractible lifter 140 has a telescopic structure (for example, a one-stage telescopic structure). The telescopic structure of the lifter 140 may be a known structure. For example, the lifter 140 may include a lifter drive 141, an outer tube 142, and an inner tube 143. The outer tube 142 is fixed to the pedestal 111, and extends in the upward direction D3A from the pedestal 111. The inner tube 143 is disposed inside the outer tube 142, and is movable in the directions D3A and D3B with respect to the outer tube 142. The lifter drive 141 moves the inner tube 143 in the directions D3A and D3B. Although the lifter drive 141 is driven using electric power as a power source, it may be configured to be driven by other power sources, such as air pressure and hydraulic pressure.

For example, the lifter drive 141 may include an electric actuator, and a transmission mechanism which transmits a driving force of the electric actuator to the inner tube 143. Although in this embodiment the electric actuator is a servomotor, it may be other actuators, such as a linear actuator. The transmission mechanism may be configured to convert a rotational driving force of the servomotor into a driving force for linearly moving the inner tube 143. For example, the transmission mechanism may include a rack-and-pinion structure, or a roller- or ball-screw structure, or may include an engagement chain structure. The engagement chain structure may be a structure in which two chains form a columnar body which pushes up the inner tube 143 by engaging with each other, and the height of the inner tube 143 is changed according to the engaging length of the two chains. The servomotor of the lifter drive 141 is controlled by the controller 180.

Although not limited, in this embodiment, the lifter 140 is disposed at a position which is eccentric in the direction D1A with respect to the pedestal 111. For example, the lifter 140 is disposed in the upward direction D3A from the driving wheels 112a and 112b. Therefore, much of loads of the lifter 140 and the robotic arm 120 acts on the driving wheels 112a and 112b, and the frictional force between the driving wheels 112a and 112b and the support surface becomes large. That is, the rotational driving forces of the driving wheels 112a and 112b may be efficiently transmitted to the support surface.

Although not limited, in this embodiment, two robotic arms 120A and 120B are disposed at the top end of the inner tube 143 of the lifter 140 via a base 120C, as the robotic arm 120. The robotic arms 120A and 120B may be raised and lowered in the directions D3A and D3B by the lifter 140. The robotic arms 120A and 120B are both horizontally rotatable along the pedestal 111 centering on an axis S1 along the direction D3A. Each of the robotic arms 120A and 120B has a structure of a coaxial dual-arm robotic arm. In this embodiment, the robotic arms 120A and 120B are both rotatable over 360° centering on the axis S1.

Figure 6:
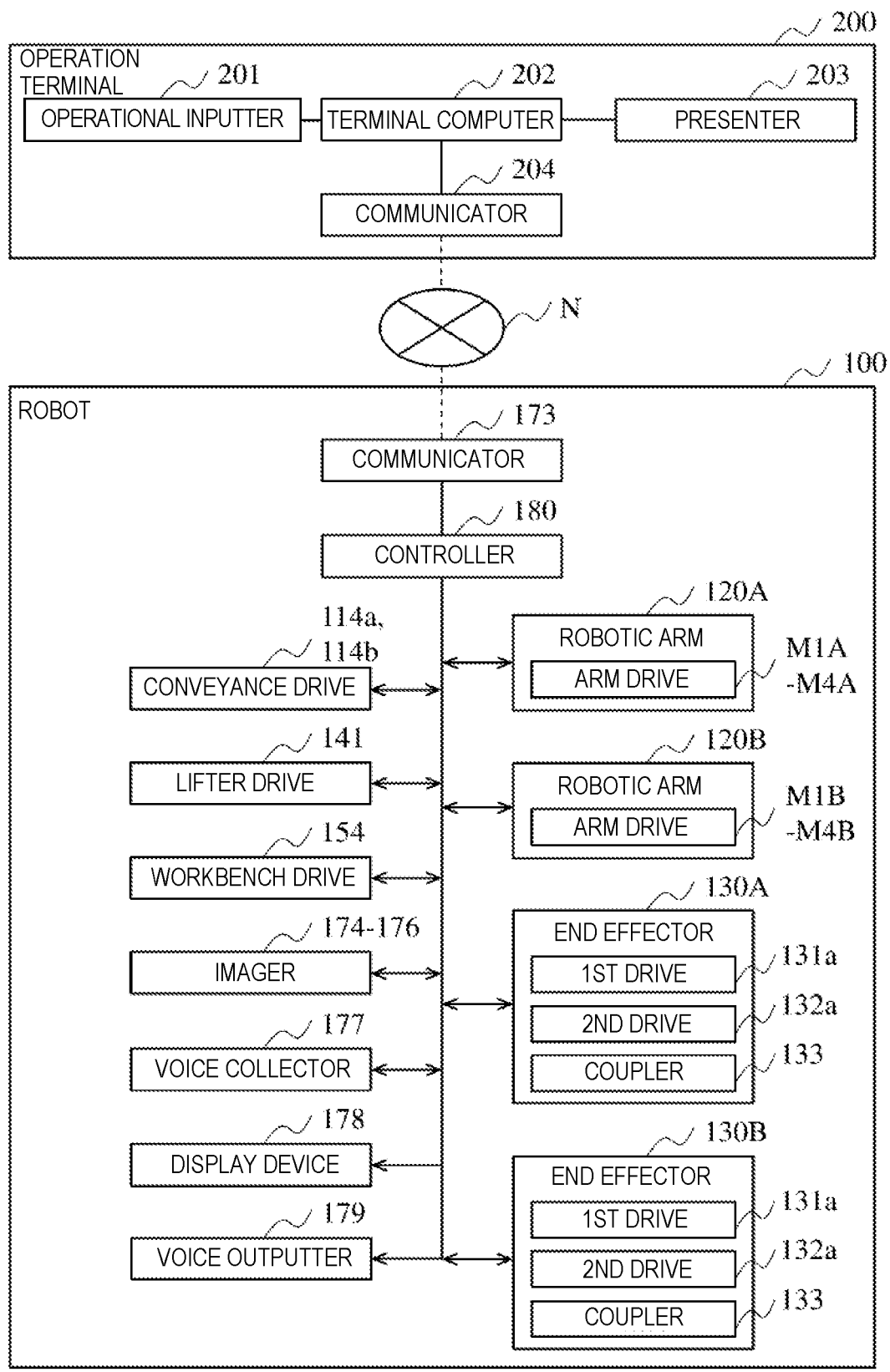
FIG. 6 is a block diagram illustrating one example of a configuration of a controller of the robot system according to one embodiment.

The robotic arm 120A includes links 121A-124A, and arm drives M1A-M4A. The robotic arm 120B includes links 121B-124B, and arm drives M1B-M4B. The arm drives M1A-M4A and M1B-M4B are illustrated in FIG. 6. The arm drives M1A-M4A and M1B-M4B use electric power as their power source, and include servomotors as electric motors. Each servomotor is controlled by the controller 180.

The links 121A and 121B are each connected with the base 120C via a rotary joint. The base 120C is attached to the top end of the inner tube 143 of the lifter 140. The links 121A and 121B are rotatable centering on the axis S1, and are disposed so as to be offset from each other in the direction of the axis S1 in order to avoid a mutual interference. The arm drives AEA and M1B can rotate the rotary joints of the links 121A and 121B to turn the links 121A and 121B, respectively.

The links 122A and 122B are connected at their base-end parts with tip-end parts of the links 121A and 121B via rotary joints, respectively. The links 122A and 122B are rotatable centering on the respective axes along the direction D3A. The arm drives M2A and M2B can rotate the rotary joints of the links 122A and 122B to turn the links 122A and 122B, respectively.

The links 123A and 123B are connected at their base-end parts with the tip-end parts of the links 122A and 122B via rotary joints, respectively. The links 123A and 123B are rotatable centering on the respective axes perpendicular to the direction D3A. The links 123A and 123B include three link members which are coupled rotatably to each other. The links 123A and 123B are each configured to rotate the three link members in interlocked fashion with its rotation. When the link 123A or 123B rotates, angles formed between the three link members are changed, and thereby, it extends and contracts in the upward direction D3A or the downward direction D3B. The links 123A and 123B are capable of changing the height for the tip-end parts. The arm drives M3A and M3B can rotate the rotary joints of the links 123A and 123B, respectively, to cause the links 123A and 123B to carry out the extending and contracting operation.

The links 124A and 124B are rotatably connected at their base-end parts with the tip-end parts of the links 123A and 123B, respectively. Each of the links 124A and 124B includes a wrist part rotatable centering on an axis along the direction D3A. The arm drives M4A and M4B can rotate rotary joints for the wrist parts of the links 124A and 124B to rotate the wrist parts, respectively. Each of the wrist parts of the links 124A and 124B includes a mechanical interface which enables a connection with the end effector 130.

Although the robotic arms 120A and 120B described above have a configuration of a horizontal articulated arm, they may have any kind of configurations. For example, the robotic arms 120A and 120B may be robotic arms of other horizontal articulated types, vertical articulated types, polar coordinate types, cylindrical coordinate types, rectangular coordinate types, or other types. The number of robotic arms 120 disposed at the lifter 140 may also be any number as long as it is one or more.

As the end effector 130, two end effectors 130A and 130B are detachably attached to the links 124A and 124B of the robotic arms 120A and 120B, respectively. The end effectors 130A and 130B may also be referred to as a "robot hand." The end effectors 130A and 130B are configured to apply an action to a target object which the robot 100 handles.

Each of the end effectors 130A and 130B includes a base 131, a tip-end piece 132, and a coupler 133. The base 131 is configured to be connected with the mechanical interface of the link 124A or 124B, and it rotatably supports a base-end part of the pillar-shaped coupler 133. The base 131 includes a first drive 131a which rotates the coupler 133. The first drive 131a is illustrated in FIG. 6. The first drive 131a uses electric power as its power source, and includes a servomotor as an electric motor. The servomotor is controlled by the controller 180.

A tip-end part of the coupler 133 includes a mechanical interface which enables a detachable connection with the tip-end piece 132. Therefore, the tip-end pieces 132 according to the types of the actions required for the end effectors 130A and 130B may be attached to the bases 131.

The tip-end piece 132 is configured to be capable of performing operation for applying the action to the target object. For example, the tip-end piece 132 has a configuration according to the type of the work. The configuration of the tip-end piece 132 is not limited in particular, as long as it constitutes a part of the end effector 130A or 130B. For example, the tip-end piece 132 may have configurations of various types of robot hands, and may have a configuration of a part of the robot hand, such as pawls and fingers. Although not limited, in this embodiment, the tip-end piece 132 includes a second drive 132a which generates a driving force for operating the tip-end piece 132. The second drive 132a is illustrated in FIG. 6.

The second drive 132a includes an actuator. The configuration of the actuator is not limited in particular. In this embodiment, an electric actuator which uses electric power as its power source is used. The actuator may be configured to use other power sources, such as air pressure and hydraulic pressure. The configuration of the electric actuator is not limited in particular. For example, the electric actuator may be an electric motor, a servomotor, a stepping motor, a linear actuator, an electrostrictive actuator, or a combination of two or more. Although not limited, in this embodiment, the electric actuator is the servomotor. The second drive 132a is configured to, in a state where the tip-end piece 132 is connected with the coupler 133, communicate a signal with the robot 100 and receive the supply of electric power. The electric actuator is controlled by the controller 180.

The coupler 133 includes a coupling device which performs locking for fixing the coupling of the coupler 133 to the tip-end peace 132, and unlocking for releasing the fixing of the coupling. Although not limited, for example, the coupling device may be configured to make the tip-end piece 132 into a locked state by extending the pin outwardly from the coupler 133 to engage the pin with the tip-end piece 132, and to make the tip-end piece 132 into an unlocked state by retracting the pin into the coupler 133 to disengage the pin from the tip-end piece 132.

The coupler 133 includes an actuator for causing the pin to perform the locking operation and the unlocking operation. The configuration of the actuator is not limited in particular. In this embodiment, an electric actuator which uses electric power as its power source is used. The actuator may be configured to use other power sources, such as air pressure and hydraulic pressure. The configuration of the electric actuator is not limited in particular. For example, the electric actuator may be an electric motor, a servomotor, a stepping motor, a linear actuator, a piezoelectric actuator, or a combination of two or more. For example, a stepping motor may be used for driving the pin. The electric actuator is controlled by the controller 180. Therefore, the robot 100 is capable of attaching and detaching the tip-end pieces 132 to the end effectors 130A and 130B, respectively, by itself.

The robot 100 further includes an apparatus casing 170 on the pedestal 111. The apparatus casing 170 is disposed so as to be adjacent to the lifter 140 and the robotic arms 120A and 120B in the direction D1B with respect to the lifter 140. Although not limited, in this embodiment, the apparatus casing 170 is disposed at a position which is eccentric in the direction D1B with respect to the pedestal 111, and is located in the direction D1B from the driving wheels 112a and 112b. Although the configuration of the apparatus casing 170 is not limited in particular, it may have a box-shaped configuration surrounded by a wall, or a frame-like configuration, for example. In this embodiment, the apparatus casing 170 has a rectangular parallelepiped appearance.

The rechargeable battery module 171, the power supply circuit 172, the communicator 173, and the controller 180 are disposed inside the apparatus casing 170, and they may be disposed at given positions by being attached to the apparatus casing 170. For example, the rechargeable battery module 171 may be disposed on the pedestal 111, and the power supply circuit 172 may be disposed above the rechargeable battery module 171. The communicator 173 and the controller 180 may be disposed at any positions of the apparatus casing 170.

The rechargeable battery module 171 functions as an electric power source of the robot 100. The rechargeable battery module 171 includes one or more rechargeable batteries. The rechargeable battery is a battery capable of charging and discharging electric power. Examples of the rechargeable battery are a lead storage battery, a rechargeable lithium-ion battery, a solid state battery, a nickel hydrogen storage battery, a nickel cadmium storage battery, etc.

The power supply circuit 172 is a circuit which controls the supply and demand of electric power for the rechargeable battery module 171. The power supply circuit 172 is configured to control the electric power according to a command etc. of the controller 180. For example, the power supply circuit 172 may include an apparatus, such as a converter, an inverter, a transformer, and an amplifier.

The power supply circuit 172 is configured to be connected with an external power source, such as a commercial power source. The power supply circuit 172 accepts the supply of electric power from the external power source, and supplies the electric power to the rechargeable battery module 171 to store electricity in the rechargeable battery module 171. The power supply circuit 172 controls the electric power supplied to the rechargeable battery module 171.

The power supply circuit 172 supplies the electric power accumulated in the rechargeable battery module 171 to component(s) which consumes the electric power in the robot 100. The power supply circuit 172 controls the electric power supplied to each component.

The communicator 173 is a device for wireless communications, and it is configured to be wirelessly connected with the communication network N. The wireless communications which the communicator 173 uses are not limited in particular. For example, the wireless communications may use mobile data communications, a wireless LAN such as radio Wi-Fi (Wireless Fidelity), a short-distance wireless communications, such as Bluetooth® and ZigBee®, or a combination of two or more. The communicator 173 has an apparatus corresponding to the wireless communications to be used.

Figure 4:
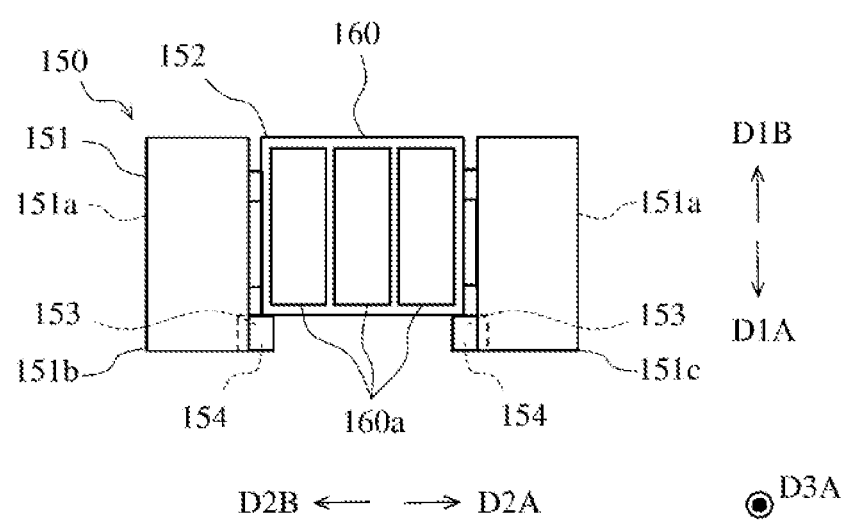
FIG. 4 is a top view illustrating one example of a configuration of a workbench unit in an open state and a storage according to one embodiment.

FIG. 4 is a top view illustrating one example of a configuration of the workbench unit 150 and the storage 160 in the open state according to one embodiment. As illustrated in FIGS. 2 to 4, the storage 160 is disposed above the apparatus casing 170 in the direction D3A. The storage 160 is capable of storing one or more tip-end pieces 132 of the end effectors 130A and 130B. In this embodiment, the storage 160 is capable of storing tip-end pieces 132, and has storing pockets 160a where the tip-end pieces 132 are accommodated, respectively. The storage 160 and each storing pocket 160a open upwardly in the direction D3A. The robotic arms 120A and 120B can insert the tip-end pieces 132 of the end effectors 130A and 130B into the storing pockets 160a of the storage 160 from above, and cause the couplers 133 to release the connection to remove the tip-end pieces 132 from the bases 131 and store them in the storing pockets 160a, respectively. The robotic arms 120A and 120B can cause the bases 131 to which the tip-end pieces 132 of the end effectors 130A and 130B are not attached to access the tip-end pieces 132 stored in the storing pockets 160a of the storage 160 from above, and cause the couplers 133 to perform the connection to attach the tip-end pieces 132 to the bases 131, respectively.

The configuration of the storage 160 is not limited in particular, as long as it may store one or more tip-end pieces 132. A storage having a known configuration may be used as the storage 160. The storage 160 is preferred to be configured so that, by access from above, the tip-end piece 132 can be stored in the storage 160 and taken out from the storage 160.

Figure 5:
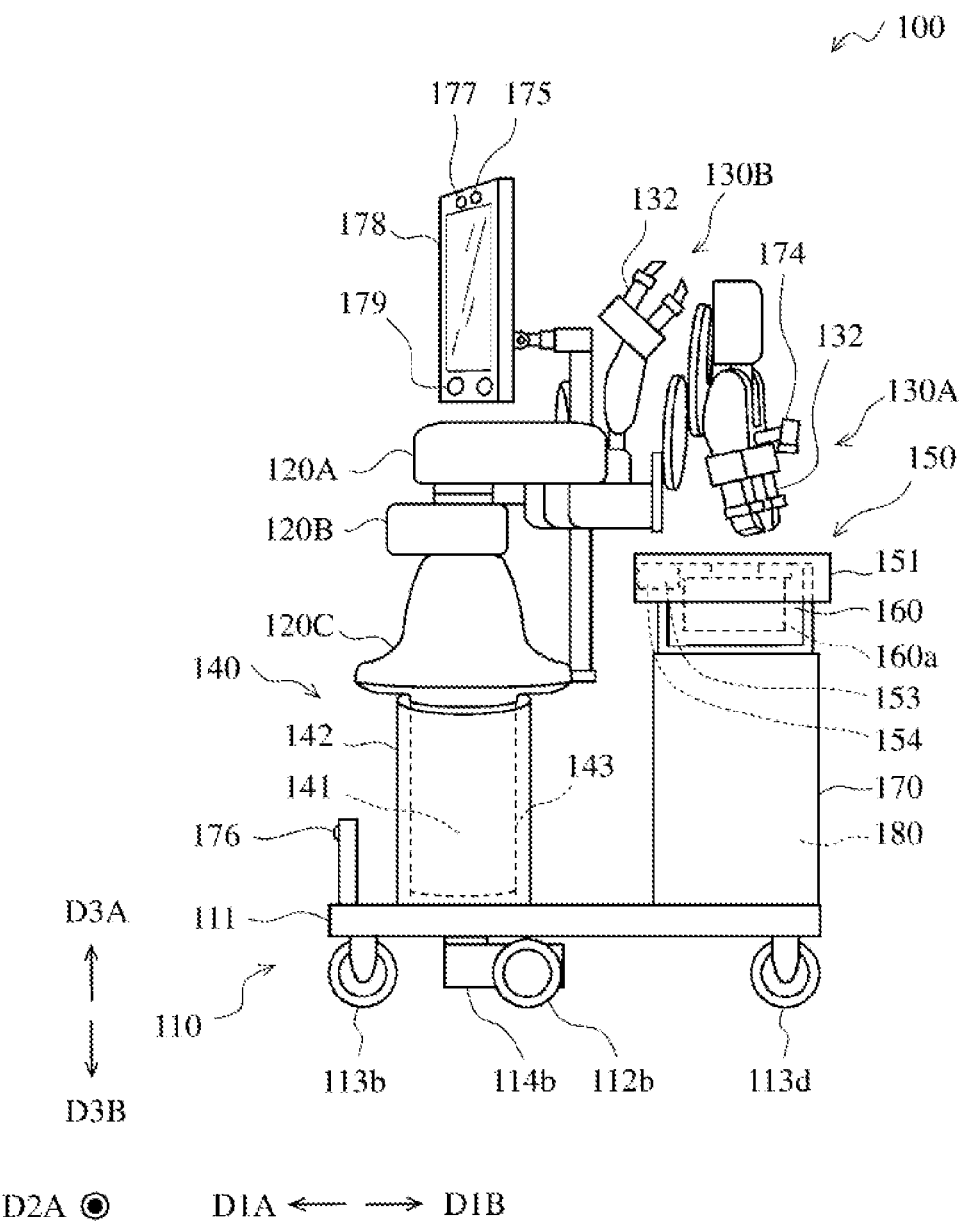
FIG. 5 is a side view illustrating one example of a state where the robot according to one embodiment replaces a tip-end piece.

Although not limited, in this embodiment, as illustrated in FIG. 5, the storage 160 is configured so that the robotic arms 120A and 120B moved to the lowest position by the lifter 140 are disposed at a height where the end effectors 130A and 130B can access the storage 160. FIG. 5 is a side view illustrating one example of a state where the robot 100 according to one embodiment replaces the tip-end piece 132. The lowest position is a height of the robotic arms 120A and 120B when the lifter 140 contracts the most in the direction D3B, and is a height where the lifter 140 can lower the robotic arms 120A and 120B the most in the direction D3B. The robotic arms 120A and 120B at the lowest position can locate the end effectors 130A and 130B in the respective storing pockets 160a of the storage 160.

The workbench unit 150 is disposed above the storage 160 in the direction D3A. Although not limited, in this embodiment, the workbench unit 150 includes a workbench 151, a support 152, a workbench drive mechanism 153, and a workbench drive 154. The support 152 is attached to the storage 160 or the apparatus casing 170, and supports other components of the workbench unit 150. Although not limited, in this embodiment, the support 152 has a configuration of a rectangular parallelepiped frame which surrounds the storage 160. The workbench 151 is one example of a shield or covering, and the workbench drive 154 is one example of a drive.

The workbench 151 is operably supported by the support 152. The workbench 151 is operable between a closed state where it covers the storage 160 from above and an open state where it opens the storage 160 upwardly. Although not limited, in this embodiment, the workbench 151 has a rectangular plate shape. The posture of the workbench 151 in the closed state is a posture in which a flat upper surface 151a of the workbench 151 extends along a surface perpendicular to the direction D3A (i.e., a horizontal surface). The posture of the workbench 151 in the open state is not limited in particular, as long as it enables the robotic arms 120A and 120B to cause the end effectors 130A and 130B to reach the storage 160 from above. For example, in the closed state, the robotic arms 120A and 120B can perform a work to the target object on the upper surface 151a of the workbench 151, and the robot 100 can transfer the target object placed on the upper surface 151a.

For example, the workbench 151 may be rotatable with respect to the support 152, like a door. In this case, the workbench 151 may be rotatable centering on an edge of the workbench 151, or may be rotatable centering on an intermediate position of the workbench 151, such as the center. For example, the workbench 151 may be slidable with respect to the support 152, like a window. In this case, the workbench 151 may be configured to slide between the closed state and the open state while maintaining the posture, or may be configured to slide while changing the posture. The workbench 151 may be attachable and detachable to/from the support 152.

The workbench 151 may include one plate-like member, or may include two or more plate-like members. If the workbench 151 includes two or more plate-like members, the two or more plate-like members may form one flat upper surface 151a in the closed state.

The workbench drive 154 gives a driving force to the workbench drive mechanism 153 to operate the workbench 151 to either or both of the closed state and the open state via the workbench drive mechanism 153. The workbench drive 154 includes an actuator which generates the driving force. Although the configuration of the actuator is not limited in particular, in this embodiment, it is an electric actuator which uses electric power as its power source. The actuator may be configured to use other power sources, such as air pressure and hydraulic pressure. The configuration of the electric actuator is not limited in particular. For example, the electric actuator may be an electric motor, a servomotor, a stepping motor, a linear actuator, a piezoelectric actuator, or a combination of two or more. The electric actuator is controlled by the controller 180.

The workbench drive mechanism 153 is a mechanism which transmits the driving force of the workbench drive 154 to the workbench 151, and operates the workbench 151 between the closed state and the open state. For example, the workbench drive mechanism 153 may include a mechanism which converts the rotational driving force of the electric actuator of the workbench drive 154 into a linear driving force. The workbench drive mechanism 153 may include a reduction gear which slows down a rotational speed of the rotational driving force of the electric actuator of the workbench drive 154 while increasing the rotational driving force, and transmits the rotational driving force.

For example, if the workbench 151 is rotatable, the workbench drive mechanism 153 may include a reduction gear, and may be configured to slow down the rotational driving force of the electric actuator and transmit it to a rotation shaft of the workbench 151. If the workbench 151 is slidable, the workbench drive mechanism 153 may be configured to convert the rotational driving force of the electric actuator into a linear driving force, and transmit it to the workbench 151.

For example, the workbench drive mechanism 153 may include a rack-and-pinion structure, a roller- or ball-screw structure, a belt-driven mechanism, or a set of a cable and a reel. The workbench drive 154 may be configured to rotate a pinion, a roller, a nut of the ball-screw structure, and a pulley or a reel for a belt. For example, the pinion may be configured to linearly move a rack included in the workbench 151. The roller may be configured to linearly move the workbench 151 where the roller contacts. The nut may be configured to linearly move a threaded shaft included in the workbench 151. The pulley may be configured to linearly move the workbench 151 by winding the belt connected to the workbench 151. The reel may be configured to linearly move the workbench 151 by winding the cable connected to the workbench 151.

In this embodiment, the workbench 151 includes two rectangular plate-like members 151b and 151c, and the plate-like members 151b and 151c have a double-door configuration. The plate-like members 151b and 151c are disposed adjacent to each other in the direction D2A. One of edges of the plate-like member 151b is attached to an edge of the support 152 in the direction D2B via hinges, and one of edges of the plate-like member 151c is attached to an edge of the support 152 in the direction D2A via hinges. The workbench drive mechanism 153 and the workbench drive 154 are disposed at the hinge of each of the plate-like members 151b and 151c, and rotate the axes of the hinges. Since the size of the plate-like members 151b and 151c is smaller than a workbench 151 which is formed by a single plate-like member, it is possible to reduce a space required for the rotation of the plate-like members 151b and 151c.

The display device 178 includes a display 178a capable of displaying an image, and a support 178b which supports the display 178a. The display 178a is capable of displaying an image of image data sent from the controller 180. The controller 180 may display on the display 178a an image for communicating with the user P who faces against the robot 100, an image according to a command received from the operation terminal 200, an image for providing other various information to the user P, etc.

The support 178b is supported by the inner tube 143 of the lifter 140, and is raised and lowered together with the inner tube 143. The support 178b is disposed in the direction D1B with respect to the base 120C. The support 178b has a pillar shape extending in the direction D3A. The support 178b supports the display 178a so as to hold it at a position in the direction D3A from the robotic arms 120A and 120B (i.e., an upward position). The display 178a is supported by the support 178b in a posture in which a screen of the display 178a is oriented in the direction D1A.

Therefore, the display 178a may be raised and lowered together with the robotic arms 120A and 120B by the lifter 140. Further, interference of the robotic arms 120A and 120B with the display 178a and the support 178b is suppressed. When the user P located in the direction D1A with respect to the robot 100 sees the display 178a, it is suppressed that the screen of the display 178a is interrupted by the robotic arms 120A and 120B. Therefore, smooth communications with the user P become possible.

The display device 178 may include a gimbal 178c between the display 178a and the support 178b. The gimbal 178c is operable to change the posture of the display 178a. The gimbal 178c may be configured to be operated by a human hand, or may be configured to be operated by an electric drive, such as a motor. The drive may be controlled by the controller 180.

The voice collector 177 includes a microphone which is capable of acquiring voice from the circumference, and outputting a voice signal of the voice. The voice collector 177 is configured to output the voice signal to the controller 180, and the controller 180 is configured to convert the voice signal into voice data, and transmit it to the operation terminal 200. Although not limited, in this embodiment, the voice collector 177 is disposed at an upper part of the display 178a, and is oriented in the same direction as the screen of the display 178a. The voice collector 177 may be raised and lowered together with the robotic arms 120A and 120B by the lifter 140.

The voice outputter 179 includes a speaker which is capable of converting the voice signal into sound wave and emitting it as voice. The voice outputter 179 is capable of outputting voice corresponding to the voice signal sent from the controller 180. The controller 180 may cause the voice outputter 179 to output voice for communicating with the user P who faces against the robot 100, voice according to a command received from the operation terminal 200, voice for providing other various information to the user P, etc. Although not limited, in this embodiment, the voice outputter 179 is disposed at a lower part of the display 178a, and is oriented in the same direction as the screen of the display 178a. The voice outputter 179 may be raised and lowered together with the robotic arms 120A and 120B by the lifter 140. Therefore, the smooth communications with the user P become possible.

Each of the imagers 174, 175, and 176 includes a camera which captures a digital image, and is configured to send data of the captured image to the controller 180. The controller 180 may be configured to process the image data captured by the imagers 174, 175, and 176 into network-transmittable data, and send it to the operation terminal 200 via the communication network N.

The imager 174 is disposed at the tip-end part(s) of one or both of the robotic arms 120A and 120B. Although not limited, in this embodiment, the imager 174 is disposed at the coupler 133 of the end effector 130A of the robotic arm 120A, and is directed to the tip-end piece 132. The imager 174 is capable of imaging the target object to which robotic arm 120A and the end effector 130A apply the action. Therefore, the operator PO can operate the robot 100 smoothly.

The imager 175 is disposed so as to be raised and lowered together with the robotic arms 120A and 120B by the lifter 140. Although not limited, in this embodiment, the imager 175 is disposed at an upper part of the display 178a, and is oriented in the same direction as the screen of the display 178a. The imager 175 is capable of imaging the user P, to whom the service is offered and who faces against the robot 100. Therefore, the operator PO can operate the robot 100 corresponding to the user P.

The imager 176 is fixed to the carriage 110 and is disposed so as to be oriented in the direction D1A which is the forward direction of the carriage 110. Although not limited, in this embodiment, the imager 176 is disposed at the pedestal 111. The imager 176 is capable of imaging a situation ahead of the carriage 110 during a forward movement of the carriage 110. Therefore, the operator PO can operate the robot 100 smoothly.

The controller 180 is configured to control the entire robot 100. FIG. 6 is a block diagram illustrating one example of a configuration of the controller 180 of the robot system 1 according to one embodiment. As illustrated in FIG. 6, the controller 180 is connected with the terminal computer 202 of the operation terminal 200 via the communicator 173, the communication network N, and the communicator 204 so that data communications are possible. The controller 180 controls operation of each component of the robot 100 according to a command etc. received from the terminal computer 202. The controller 180 controls operation of each component of the robot 100 according to a control program stored. Therefore, the robot 100 is capable of being operated by the operator PO who is present at a remote location distant from the robot 100, and is capable of providing services instead of a service provider.

Examples of the component to be controlled by the controller 180 are the conveyance drives 114a and 114b, the lifter drive 141, the workbench drive 154, the arm drives M1A-M4A of the robotic am 120A, the arm drives M1B-M4B of the robotic arm 120B, the first drive 131a and the second drive 132a and the coupling device of the coupler 133 of each of the end effectors 130A and 130B, the imagers 174-176, the voice collector 177, the display device 178, and the voice outputter 179, but not all of them are essential.

When controlling the electric power supplied to each component, the controller 180 may be configured to output a command value etc. of current to the power supply circuit 172 to cause the power supply circuit 172 to supply electric power of the rechargeable battery module 171 to the component. The controller 180 may be configured to servo-control the servomotor. The controller 180 may be configured to acquire from each servomotor a detection result of a rotation sensor included in the servomotor, acquire a supply current value to the servomotor from the power supply circuit 172, and determine a command value of the current to the servomotor by using the detection result of the rotation sensor and the supply current value as feedback information. The supply current value may be a command value of the current supplied to the servomotor from the power supply circuit 172, or may be a detection result of the current sensor which may be included in the servomotor.

The controller 180 may be configured to cause each component of the robot 100 to perform one or more operations of manual operation, autonomous operation, and a combination of the manual operation and the autonomous operation.

In the manual operation, the controller 180 may be configured to cause the component to operate, sequentially according to the contents of operation which are inputted into the operation terminal 200 and transmitted to the controller 180.

In the autonomous operation, the controller 180 may be configured to, according to a command which is inputted into the operation terminal 200 and transmitted to the controller 180, cause the component to automatically (i.e., autonomously) perform a series of tasks corresponding to the command.

In the combination of the manual operation and the autonomous operation, the controller 180 may be configured to, according to the contents of operation and a command received from the operation terminal 200, cause the component to suitably perform operation sequentially according to the contents of operation and operation in which a series of tasks are autonomous y performed. For example, the controller 180 may be configured to, when the contents of manipulation for correcting operation are received from the operation terminal 200 during the autonomous operation, cause the component to operate according to the contents of manipulation.

The controller 180 includes a computer. For example, the controller 180 may be configured as an electronic circuit board, an electronic controller, a microcomputer, and other electronic apparatuses. The computer may include a processor such as a CPU (Central Processing Unit), a volatile semiconductor memory such as a ROM, a nonvolatile semiconductor memory such as a RAM (Random Access Memory), etc. For example, a program for causing the CPU to operate is held beforehand in the ROM etc. The CPU reads the program from the ROM and develops it in the RAM. The CPU executes each coded command in the program developed by the RAM.

Each function of the controller 180 may be realized by a computer system including the CPU, the ROM, the RAM, etc., or may be realized by hardware circuitry for exclusive use, such as an electronic circuit or an integrated circuit, or may be realized by a combination of the above-described computer system and hardware circuitry. The controller 180 may be configured to perform each processing by a centralized control with a sole device, or may be configured to perform each processing by a distributed control with a collaboration of devices.

Although not limited, for example, the processor may include a CPU, an MPU (Micro Processing Unit), a GPU (Graphics Processing Unit), a microprocessor, a processor core, a multiprocessor, an ASIC (Application-Specific Integrated Circuit), and an FPGA (Field Programmable Gate Array), and each processing may be realized by logical circuitry or dedicated circuitry formed in an IC (integrated circuit) chip, an LSI (Large Scale Integration), etc. Processings may be realized by one or more integrated circuits, or may be realized by a sole integrated circuit.

[Operation of Robot System]

Figure 7:
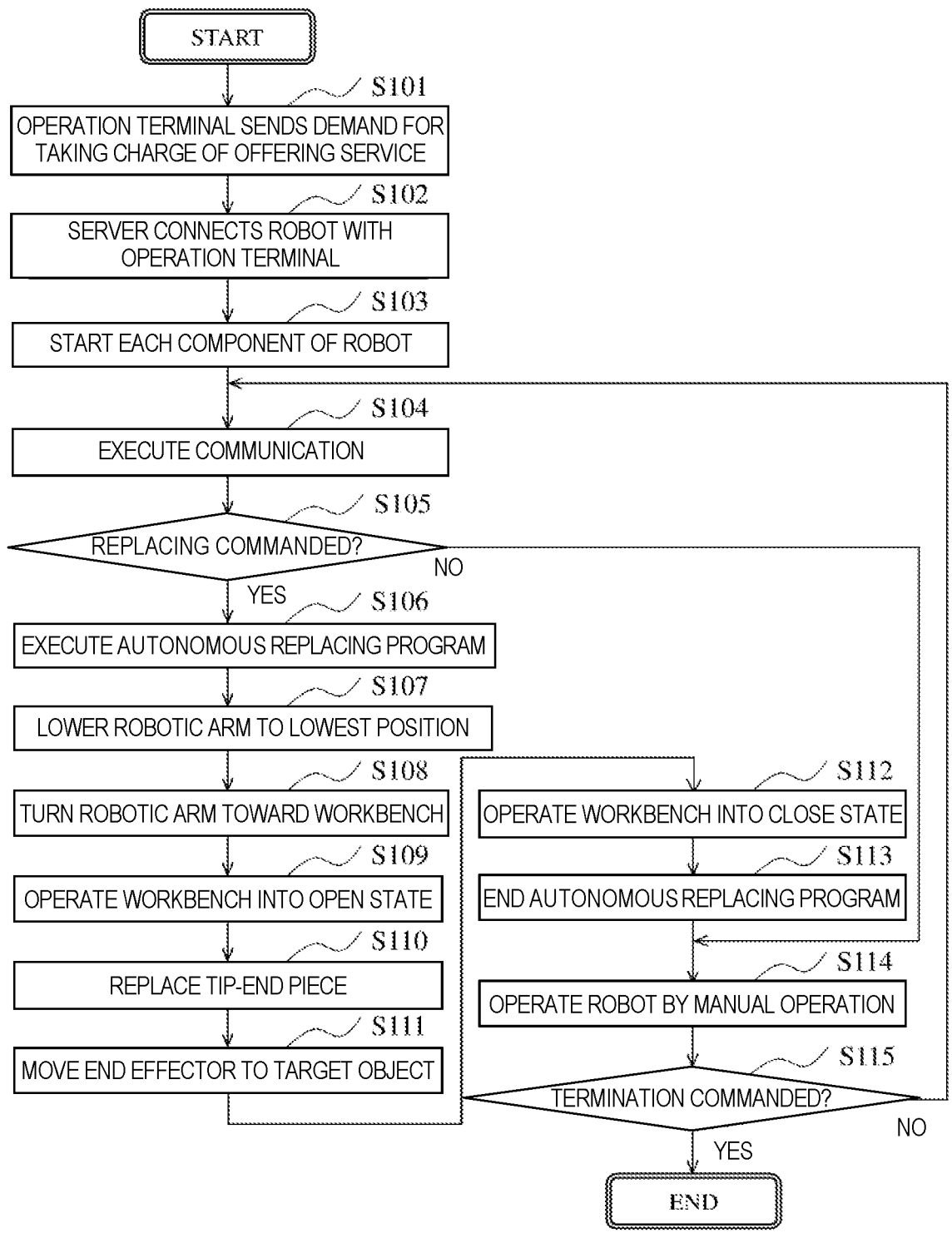
FIG. 7 is a flowchart illustrating one example of operation of the robot system according to one embodiment.

One example of operation of the robot system 1 according to one embodiment is described with reference to FIG. 7. FIG. 7 is a flowchart illustrating one example of the operation of the robot system 1 according to one embodiment. In this example, the following explanation is given under a condition in which the robot 100 is manually operated through the operation terminal 200.

First, the operator PO in the operation area AO inputs into the operation terminal 200 a demand for taking charge of offering a service, and the service of which he/she wishes to take charge, and the operation terminal 200 transmits the demand etc. to the server 300 (Step S101). The server 300 searches for a robot 100 which is able to perform the desired service, and connects the controller 180 of the searched robot 100 with the above-described operation terminal 200 via the communication network N (Step S102).

If a notice of the completion of the connection is received from the server 300, the operator PO starts each component of the robot 100 through an input to the operation terminal 200 (Step S103).

The operator PO operates the operation terminal 200 to perform communications with the user P in the service providing area AS by using the imagers 174, 175, and 176, the voice collector 177, the display device 178, and the communicator, such as the voice outputter 179 (Step S104).

For example, the operator PO judges whether the end effectors 130A and 130B of the robot 100 are suitable for execution of the service requested by the user P. If not suitable, the operator PO inputs into the operation terminal 200 a command for replacing the tip-end piece 132 of the unsuitable end effector which is one or both of the end effectors 130A and 130B. Although not limited, the following is described under condition in which both the end effectors 130A and 130B are unsuitable. At this time, the operator PO inputs into the operation terminal 200 a command for specifying two tip-end pieces 132, which are targets to be replaced, among the tip-end pieces 132 for the end effector stored in the storage 160. The operation terminal 200 transmits to the controller 180 the command for replacing the tip-end pieces 132, and the information on the tip-end pieces 132 which are targets to be replaced.

If the command for replacing the tip-end pieces 132 is received (Yes at Step S105), the controller 180 transits to Step S106, and if not received (No at Step S105), it transits to Step S114.

At Step S106, the controller 180 executes an autonomous replacing program of the tip-end pieces 132 of the end effectors 130A and 130B. For example, when replacing one of the tip-end pieces 132 of the end effectors 130A and 130B, the controller 180 executes the autonomous replacing program of the tip-end piece 132 of the end effector, which is to be replaced.

The controller 180 causes the lifter drive 141 to contract the lifter 140 to move the robotic arms 120A and 120B to the lowest position (Step S107). Therefore, the center of gravity of the robot 100 becomes stable. Next, the controller 180 turns the robotic arms 120A and 120B toward the workbench 151 (Step S108). Next, the controller 180 causes the workbench drive 154 to operate the closed workbench 151 into the open state (Step S109).

Next, for example, as illustrated in FIG. 5, the controller 180 causes the robotic arms 120A and 120B to replace the tip-end pieces 132 of the end effectors 130A and 130B with the tip-end pieces 132 in the storage 160 (Step S110). For example, the controller 180 causes the robotic arm 120A to insert the tip-end piece 132 of the end effector 130A into an empty storing pocket 160a of the storage 160, and causes the coupler 133 to unlock. Further, the controller 180 causes the robotic arm 120A to connect the coupler 133 of the end effector 130A with the target tip-end piece 132 in the storage 160, and causes the coupler 133 to lock. The controller 180 replaces the tip-end piece 132 of the end effector 130B similarly to the end effector 130A.

Next, the controller 180 turns the robotic arms 120A and 120B to move the end effectors 130A and 130B to the target object (Step S111). Further, the controller 180 causes the workbench drive 154 to operate the open workbench 151 into the closed state (Step S112). Therefore, the workbench 151 becomes usable.

Next, the controller 180 ends the autonomous replacing program, and executes a manual operation program (Step S113).

Next, the operator PO inputs operation into the operation terminal 200 in order to cause the robot 100 to carry out operation for the service offer, and the controller 180 causes the robot 100 to operate according to the contents of operation received from the operation terminal 200 (Step S114). That is, the controller 180 causes the robot 100 to perform the operation for the service offer by the manual operation.

Next, when the operator PO ends taking charge of the service offer, he/she inputs a command for termination into the operation terminal 200, and the operation terminal 200 transmits the command to the server 300. If the command for termination of the charge is received (Yes at Step S115), the server 300 cuts the connection between the operation terminal 200 and the robot 100, and ends the series of processings. If the server 300 does not receive the command for termination of the charge (No at Step S115), the controller 180 returns to Step S104, and repeats subsequent processings.

In the above example, the controller 180 is configured to cause the robot 100 to perform the series of processings of Steps S107-S112 by the autonomous operation, but it is not limited to this configuration. For example, the controller 180 may be configured to cause the robot 100 to perform one or more processings of Steps S107-S112 according to a command received from the operation terminal 200, or may be configured to cause the robot 100 to perform one or more processings by the manual operation.

The autonomous replacing program may not include one or more of Steps S107-S112. For example, one or both of S111 and S112 may not be included in the autonomous replacing program.

The controller 180 may be configured to cause the robot 100 to perform the processing of Step S114 in the autonomous operation, or the combination of the autonomous operation and the manual operation. For example, in the autonomous operation, the controller 180 may be configured to, according to a command for a task received from the operation terminal 200, cause the robot 100 to perform a series of operation for performing the task.

Other Embodiments

Although examples of the embodiment of the present disclosure are described above, the present disclosure is not limited to the above-described embodiment. That is, various modifications and improvements are possible within the scope of the present disclosure. For example, what obtained by applying various modifications to the embodiment, and forms built by combining the components in different embodiments are also encompassed in the scope of the present disclosure.

For example, although in this embodiment the workbench unit 150 includes the workbench drive 154 which operates the workbench 151, it is not limited to this configuration. For example, the workbench unit 150 may not include the workbench drive mechanism 153 and the workbench drive 154. In this case, one or both of the robotic arms 120A and 120B may operate the workbench 151 by using one or both of the end effecters 130A and 130B. The controller 180 may be configured to cause the robotic arms 120A and 120B and the end effectors 130A and 130B to operate the workbench 151 by the autonomous operation, or may be configured to cause them to operate the workbench 151 by the manual operation.

Although in this embodiment the tip-end pieces 132 of the end effectors 130A and 130B are replaceable and the storage 160 is capable of storing the tip-end pieces 132, it is not limited to this configuration. For example, it may be configured so that the entire end effectors 130A and 130B are replaceable, and the storage 160 is capable of storing the end effectors 130A and 130B. In this specification and the claims, "the end effector is attachable and detachable" may include "the entire end effector is attachable and detachable" and "a part of the end effector is attachable and detachable." Further, "the end effector is attached and detached" may include "the entire end effector is attached and detached" and "a part of the end effector is attached and detached." "The end effector is stored" may include "the entire end effector is stored" and "a part of the end effector is stored."

Although in this embodiment the storage 160 is configured so that, by access from above, the tip-end pieces 132 of the end effectors 130A and 130B are storable and extractable, it is not limited to this configuration. For example, the storage 160 may be configured so that, by access from the side, the tip-end pieces 132 of the end effectors 130A and 130B are storable and extractable. The storage 160 may be configured so that, by access from the side, the end effectors 130A and 130B are storable and extractable.

Figure 8:
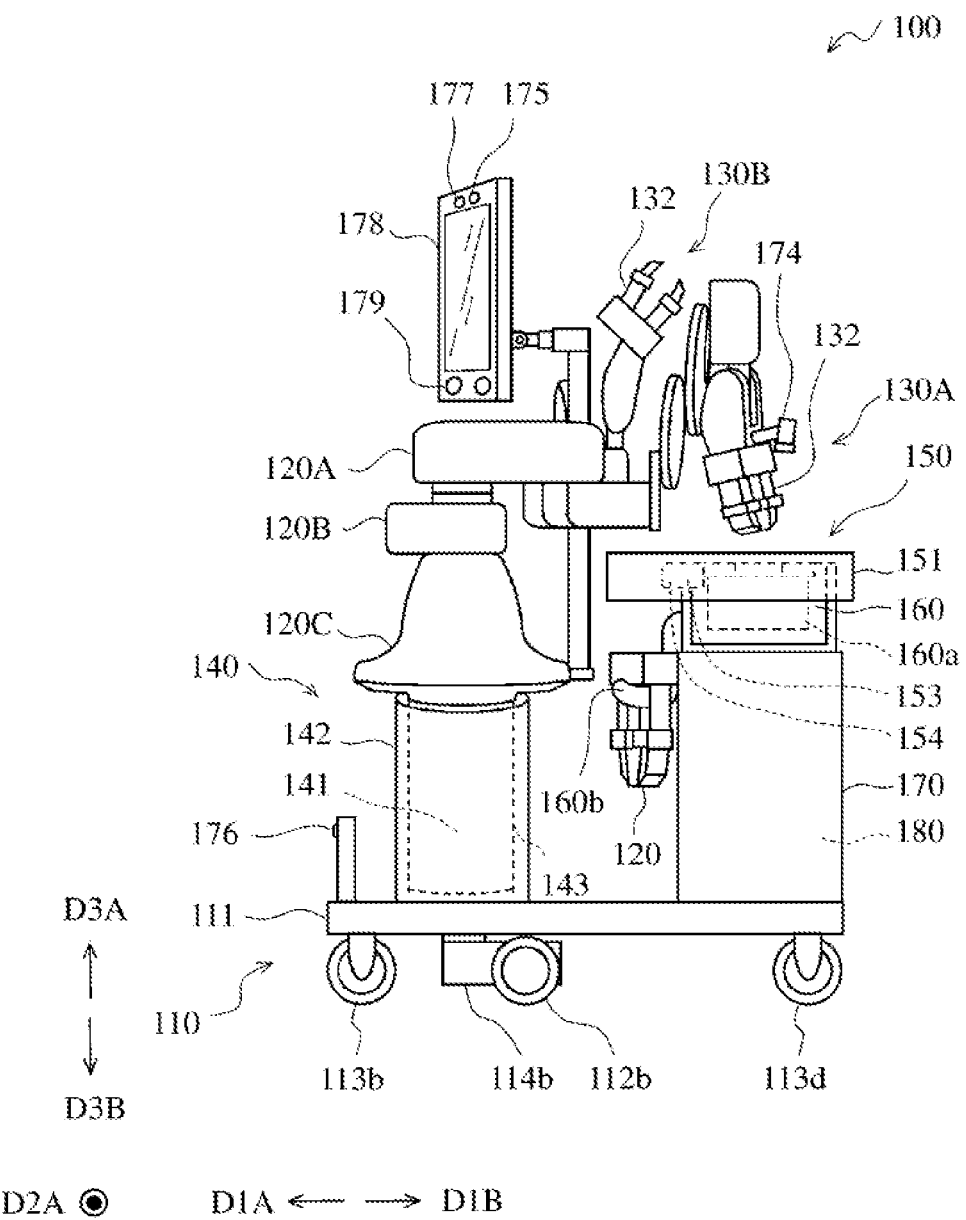
FIG. 8 is a side view illustrating a modification of the storage according to one embodiment.

For example, as illustrated in FIG. 8, the storage 160 may be configured to store one or both of the end effectors 130A and 130B and the tip-end pieces 132 outside the storage 160. FIG. 8 is a side view illustrating a modification of the storage 160 according to one embodiment. The storage 160 may include a fastener 160b outside thereof. The fastener 160b may be for stopping or fastening any of the end effectors 130A and 130B and the tip-end pieces 132. Although in this modification the fastener 160b is fixed to the storage 160, it may be fixed to the apparatus casing 170, the support 152, etc. For example, the fastener 160b may be configured so that one or both of the end effectors 130A and 130B and the tip-end pieces 132 may be hooked or suspended, and, for example, it may have a hook-like structure.

In this case, the workbench 151 may have the size which is capable of covering the storage 160, and the end effectors 130A and 130B and the tip-end pieces 132 which are fastened by the fastener 160b outside the storage 160, from above. Therefore, even if the end effectors 130A and 130B and the tip-end pieces 132 have the sizes which cannot be fit in the storing pockets 160a of the storage 160, the storing by the storage 160 and the covering by the workbench 151 are still possible.

Although in this embodiment the plate-like workbench 151 is illustrated as the covering of the storage 160, the configuration of the covering is not limited to this configuration. The covering is preferred to be capable of covering the storage 160, and the end effectors 130A and 130B and the tip-end pieces 132 which are stored in the storage 160, from above, and covering them from the outside. For example, the covering may be configured to be a rigid member like the workbench 151, or may be configured to be a flexible member. For example, like a shutter, the covering may be configured to be deformable, such as bendable, for the open operation and the close operation, while it is configured to be the rigid member. For example, the covering may be configured to be curvable for the open operation and the close operation. For example, the covering may be formed by a flexible sheet material.

Although in this embodiment the robot 100 is used as a robot for providing a service to people, it may be used for other applications. For example, the robot 100 may be configured to be used for a work in a factory, a warehouse, etc.

Each example of the mode of the art of the present disclosure is given as follows. The robot according to one aspect of the present disclosure includes a self-propelled carriage, one or more robotic arms that are mounted on the carriage and allow an end effector to be attached thereto and detached therefrom, a storage that is mounted on the carriage and allows, to be stored, the end effector removed from the one or more robotic arms and the end effector to be attached to the one or more robotic arms, and a covering that is mounted on the carriage and covers the storage from above.

According to the above-described aspect, when offering a service, the robot can select an end effector suitable for the service to be offered, among the end effectors stored in the storage, and attach it to the robotic arm. The covering can block visual and physical access of a person who receives the service and people around the robot to the storage and the end effectors stored therein, by covering the storage from above. It can suppress that the mechanical appearance of the end effectors may spoil the fine sight, and that a problem may arise in the hygiene and the functions of the end effectors when the people touch them.

The covering may be configured so that the one or more robotic arms can perform a work on the covering. Thus, the robot can perform the work for offering the service using the covering, and can place and transport an article for offering the service on the covering. Further, since the storage is disposed below the covering, it becomes possible to reduce the size of the robot with regard to the lateral dimension. Therefore, the robot can be reduced in size, while carrying equipment for offering the service to people.

In the robot according to one aspect of the present disclosure, the storage may allow the end effector to be stored and extracted from above. The covering may be operable between a closed state in which the storage is covered from above and an open state in which the storage is opened upwardly.

According to the above-described aspect, the robotic arm can access to the end effector in the storage from above. In attaching or detaching of the end effector to/from the robotic arm, a working area in the lateral direction required for the robotic arm can be reduced. Since the covering is operable to make the storage into the close state and the open state, it does not need to be attached or detached for the close state and the open state. Therefore, a space for placing a detached covering is unnecessary.

In the robot according to one aspect of the present disclosure, the covering may be operated into one or both of the closed state and the open state by using the end effector by the one or more robotic arms. According to the above-described aspect, a device for operating the covering is unnecessary.

The robot according to one aspect of the present disclosure may further include a drive that operates the covering into one or both of the closed state and the open state. According to the above-described aspect, the robot can operate the covering regardless of the operation of the robotic arm and the end effector and the type of the end effector. For example, even if the end effector is not configured to be capable of operating the covering, the covering can be operated.

The robot according to one aspect of the present disclosure may further include a lifter mounted on the carriage, wherein the lifter raises and lowers the one or more robotic arms. According to the above-described aspect, for example, even if the robotic aim is small, it can cause the end effector to reach the covering and the storage by being raised and lowered by the lifter. The robot can locate the robotic arm at a height which is suitable for a user and which does not give intimidating feeling to the user, by raising and lowering the lifter according to the physique of the user who receives the service.

In the robot according to one aspect of the present disclosure, the storage may be disposed at a height accessible to the one or more robotic arms moved to a lowest position by the lifter. According to the above-described aspect, the height of the storage can be low. By locating the robotic arm to the lowest position, the robotic arm can perform the attaching and detaching operations of the end effector in the storage, in a state where the robot is stable with its center of gravity lowered.

The robot according to one aspect of the present disclosure may further include a rechargeable battery mounted on the carriage as a power source, the rechargeable battery being disposed adjacent to the lifter and the one or more robotic arms. The storage may be disposed above the rechargeable battery. According to the above-described aspect, the rechargeable battery, the storage, and the covering are disposed to be lined up in the up-and-down direction. Therefore, it is possible to reduce the lateral dimension of the set of the rechargeable battery, the storage, and the covering.

The functions of the elements disclosed herein may be performed using circuitry or processing circuitry including a general-purpose processor, a dedicated processor, an integrated circuit, an ASIC (Application-Specific Integrated Circuit), conventional circuitry, and/or a combination thereof, which are configured or programmed to execute the disclosed functions. Since the processor includes transistors or other circuitry, it is considered to be the processing circuitry or the circuitry. In this disclosure, the circuitry, the unit, or the means is hardware which performs the listed functions, or is hardware programmed to perform the listed functions. The hardware may be hardware disclosed herein, or may be other known hardware which are programmed or configured to perform the listed functions. When the hardware is the processor considered to be a kind of circuitry, the circuitry, the means, or the unit is a combination of hardware and software, and the software is used for a configuration of the hardware and/or the processor.

All the numbers used above, such as the order and the quantity, are illustrated in order to concretely explain the art of the present disclosure, and the present disclosure is not limited to the illustrated numbers. The connection relationships between the components are illustrated in order to concretely explain the art of the present disclosure, and the connection relationships which realize the functions of the present disclosure is not limited to those relationships.

Since the scope of the present disclosure is defined by the appended claims rather than the description of this specification so that the present disclosure may be implemented in various ways without departing from the spirits of the essential features, the illustrative embodiment and modifications are illustrative but not restrictive. All the modifications of the claims and all the modifications within the scope of the claims, or the equivalents of the claims and the equivalents within the scope of the claims are intended to be encompassed in the appended claims.

The invention claimed is:

1. A robot, comprising:
   a self-propelled carriage;
   one or more robotic arms that are mounted on the carriage and allows one or more end effectors to be attached thereto and detached therefrom;
   a storage that is mounted on the carriage and allows, to be stored, the one or more end effectors removed from the one or more robotic arms and the one or more end effectors to be attached to the one or more robotic arms; and
   a covering that is mounted on the carriage and covers the storage from above.

2. The robot of claim 1, wherein the storage allows the one or more end effectors to be stored and extracted from above, and
   wherein the covering is operable between a closed state in which the storage is covered from above and an open state in which the storage is opened upwardly.

3. The robot of claim 2, wherein the covering is operated into one or both of the closed state and the open state by using the one or more end effectors by the one or more robotic arms.

4. The robot of claim 2, further comprising a drive that operates the covering into one or both of the closed state and the open state.

5. The robot of claim 1, further comprising a lifter mounted on the carriage, wherein the lifter raises and lowers the one or more robotic arms.

6. The robot of claim 5, wherein the storage is disposed at a height accessible to the one or more robotic arms moved to a lowest position by the lifter.

7. The robot of claim 1, further comprising a rechargeable battery mounted on the carriage as a power source, the rechargeable battery being disposed adjacent to the one or more robotic arms, wherein the storage is disposed above the rechargeable battery.

* * * * *